Feb. 7, 1961 R. B. SCHMIDT 2,970,420
CROP PICKUP ATTACHMENT FOR COMBINES
Filed Sept. 22, 1958 3 Sheets-Sheet 1

INVENTOR.
Rudolf B. Schmidt
BY
ATTORNEY.

INVENTOR.
Rudolf B. Schmidt

ATTORNEY.

Feb. 7, 1961 R. B. SCHMIDT 2,970,420
CROP PICKUP ATTACHMENT FOR COMBINES
Filed Sept. 22, 1958 3 Sheets-Sheet 3
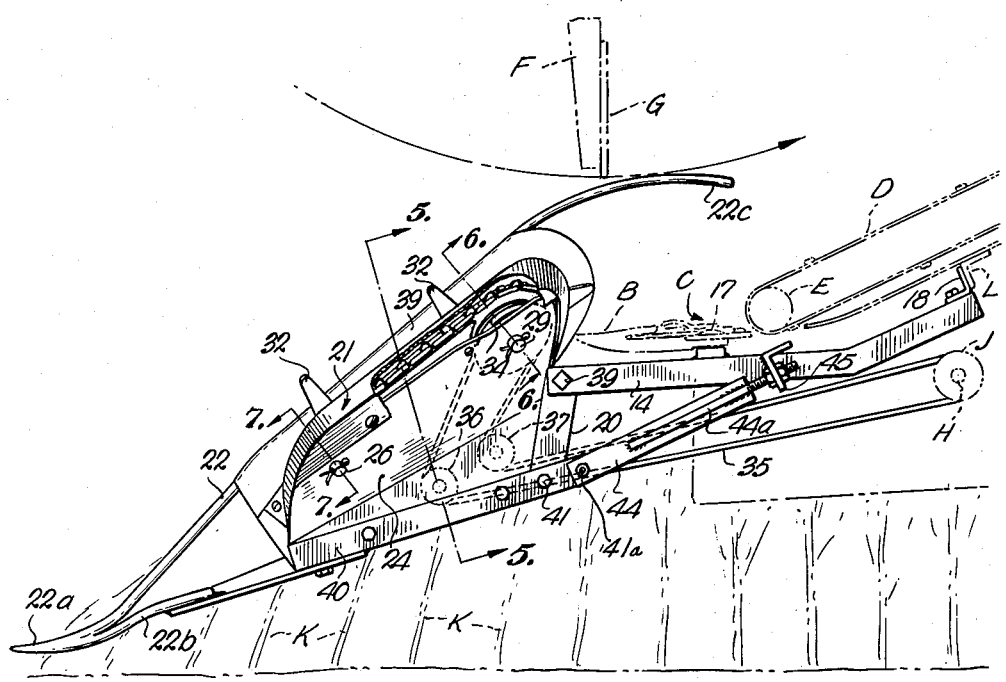
Fig. 4.
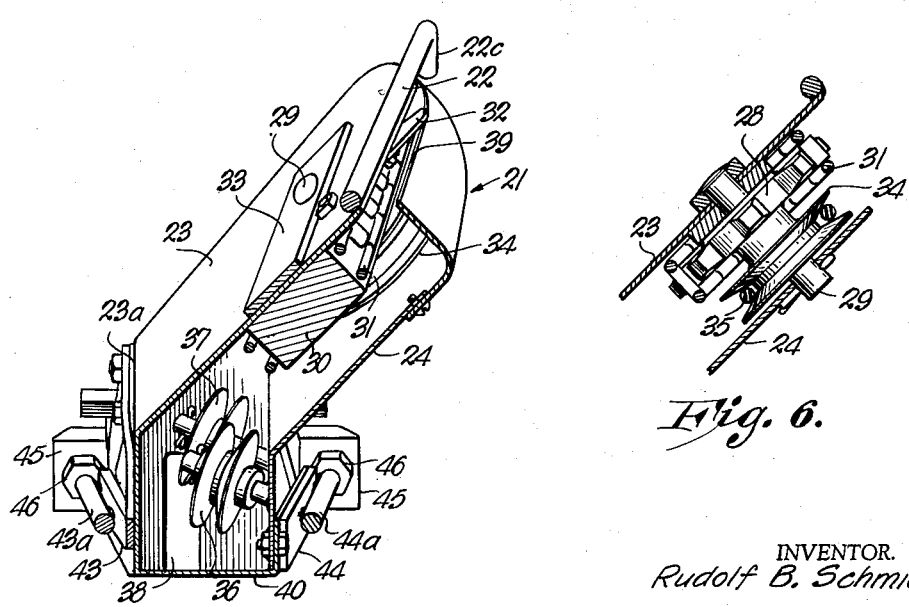
Fig. 5.
Fig. 6.
INVENTOR.
Rudolf B. Schmidt
BY Thos. E. Scofield
ATTORNEY.

United States Patent Office 2,970,420
Patented Feb. 7, 1961

2,970,420

CROP PICKUP ATTACHMENT FOR COMBINES

Rudolf B. Schmidt, Rte. 1, Box 236, Walton, Kans.

Filed Sept. 22, 1958, Ser. No. 762,568

6 Claims. (Cl. 56—98)

This invention relates to the harvesting of crops and refers more particularly to the harvesting of crops planted in rows when the plant stalks have fallen or been forced relatively flat and close to the ground. The invention finds particular advantage in the efficient harvesting by combine of downed maize and similar plants, that is, plants which have been blown or otherwise bent flat. It is also readily adaptable to the combining of other row crops such as soy beans, which are easily shattered from rough handling.

I am aware that various devices have been proposed, and even actually used, which are intended to pick up fallen or downed plants and feed or guide them to the cutter bar of a combine so that the heads can be severed and delivered to the conveyor canvas or auger of the combine, depending upon the particular make of combine involved. All of these devices of which I am aware have lifting and channeling elements which serve to snap or whip the plant upright and feed it centrally through a narrow throat which guides the stalk into the cutter bar of the combine. In all cases, the point of engagement of the lifting mechanism is quite close to the base of the stalk. As a result there are two primary problems which have long plagued manufacturers in this field: (1) There is a tendency for the roots to be pulled out of the ground rather than the stalk lifted (this is particularly true in the case of plants with long stalks and relatively massive heads), and (2) The quick lifting and channeling of the stalks into a narrow throat causes a "whipping" action of the stalk which tends to break it, thus preventing pickup of the head or the stalk chokes the throat area. This is aggravated by increased ground travel of the combine.

It is one of the important objects of the present invention to provide a row crop pickup apparatus which solves satisfactorily the above problems. It is a feature of the invention that the downed stalks are lifted gently and, further, lifted only high enough as is necessary to insure that the heads will be cut from and batted by the reel bats onto the conveyor apron or into the auger, as the case may be. Stated otherwise, in the invention the stalks are not brought to a vertical position as in other devices, but lifted only approximately 45° from the horizontal. In addition to the other advantages mentioned above, a construction producing this result improves materially the efficiency of the threshing section of the combine as less waste material is fed into the threshing mechanism.

Another important object of the invention is to provide a pickup apparatus of the character described which can be readily associated with the conventional combine and likewise, when desired, can quickly be detached therefrom. It is also an object to produce a device which is readily adjustable to accommodate plants of various stalk lengths, all without disturbing or requiring disassembly or adjustment of the components and functional parts of the combine.

A further object of the invention is to provide a crop pickup device of the character described in which the lifting force on the stalk is maintained at approximately the same location on the stalk, even while the stalk moves upward. This is particularly advantageous in that it prevents stripping of the stalk and perhaps putting it under sufficient tension to pull its roots free of the earth. This feature is quite valuable in the case of harvesting of soy beans, since shattering of the beans and crushing of the bean stalk is materially reduced, if not avoided entirely.

Still another object of the invention is to provide a device of the character described in which the pushing of the stalk and shifting it forwardly as the combine advances is materially reduced. This is accomplished in my device by providing fingers or teeth which lie adjacent and extend above the lifting surfaces and which are mounted to shift rearwardly as the combine proceeds down the row. Due to the location and character of the guide and lifting surfaces, no springs or other pressure maintaining elements need be contacted with the plant stalks to maintain the teeth or fingers in moving engagement therewith. As a consequence, there is little or no tearing of the stalks nor jamming of the mechanism with "trash."

Other and further objects of the invention, together with the features of novelty appurtenant thereto, will appear in the course of the following description.

In the accompanying drawings which form a part of the specification and are to be read in conjunction therewith, and in which like reference numerals indicate like parts in the various views:

Fig. 4 is a view similar to Fig. 3 but taken generally along the line 4—4 of Fig. 2 in the direction of the arrows, part of the feed chain housing being broken away to better show the details;

Fig. 5 is a sectional view taken along the line 5—5 of Fig. 4 in the direction of the arrows and somewhat enlarged;

Fig. 6 is another enlarged sectional view taken along the line 6—6 of Fig. 4 in the direction of the arrows.

Figure 1:
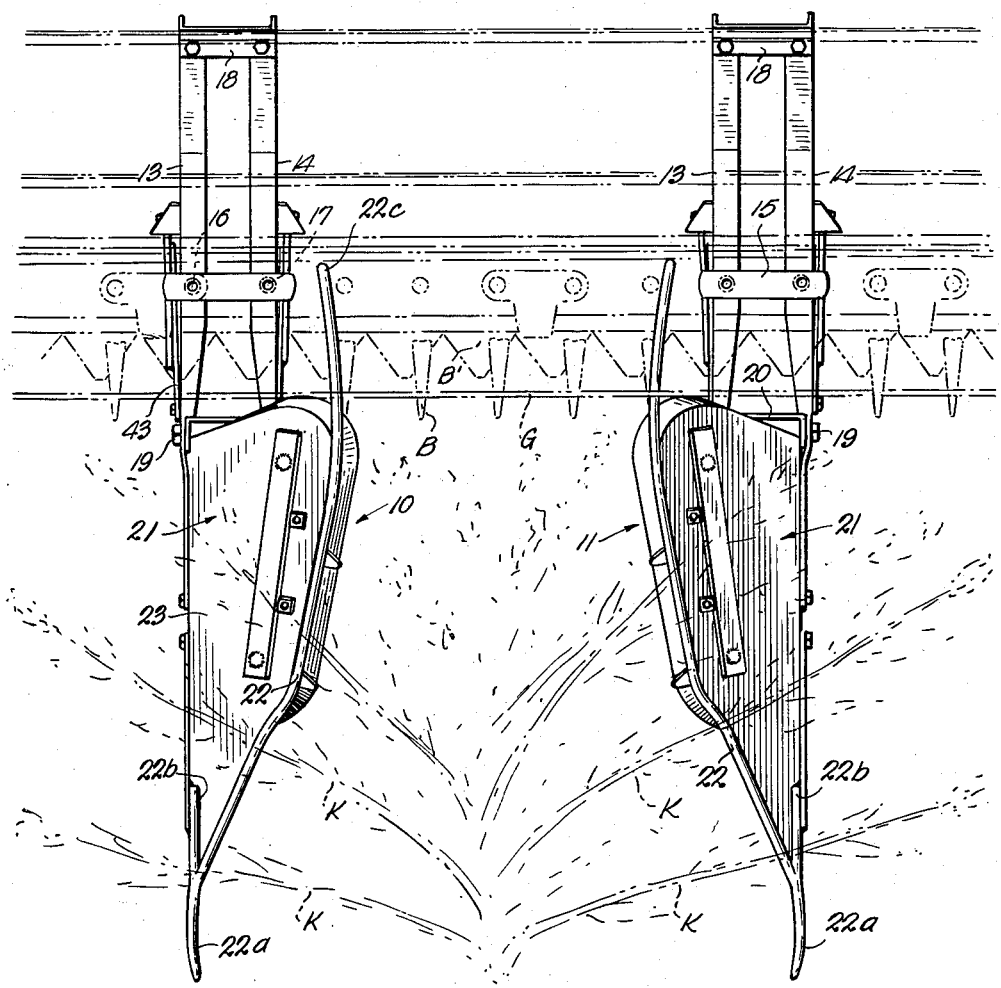
Fig. 1 is a top plan view showing a section of the cutter bar of a conventional combine equipped with a pair of lifting units constructed in accordance with the present invention, the lifting units being shown in their proper relationship on opposite sides of a crop row.

Referring to the drawings, the conventional parts of a typical combine have been shown in Figs. 1, 2, 3 and 4, these parts being shown in broken lines to aid in clarity of understanding. Such parts as shown comprise a portion of the cutter bar C having the blade guards B and blades B'. Behind the cutter bar is located a conveyor D which travels over roller E; a portion of the reel is shown at F, the reel including the relatively wide bat G which can best be seen in Figs. 3 and 4. The particular combine illustrated also has an auxiliary shaft H underlying the conveyor and on this shaft there is mounted a pair of sheaves J, only one of which is visible in Figs. 3 and 4. On some combines such a shaft may have to be added. Shaft H is driven in conventional fashion from the power system for the combine. More will be said of its speed of rotation at a later point herein. The sheaves J are constructed for adjustment lengthwise of the shaft.

For the purposes of illustrating the manner of operation of the invention, the combine and associated pickup devices are shown in conjunction with a portion of a row of downed maize in which individual stalks have been identified by reference letter K. The downed stalks are shown as falling equally on opposite sides of the row.

Figure 2:
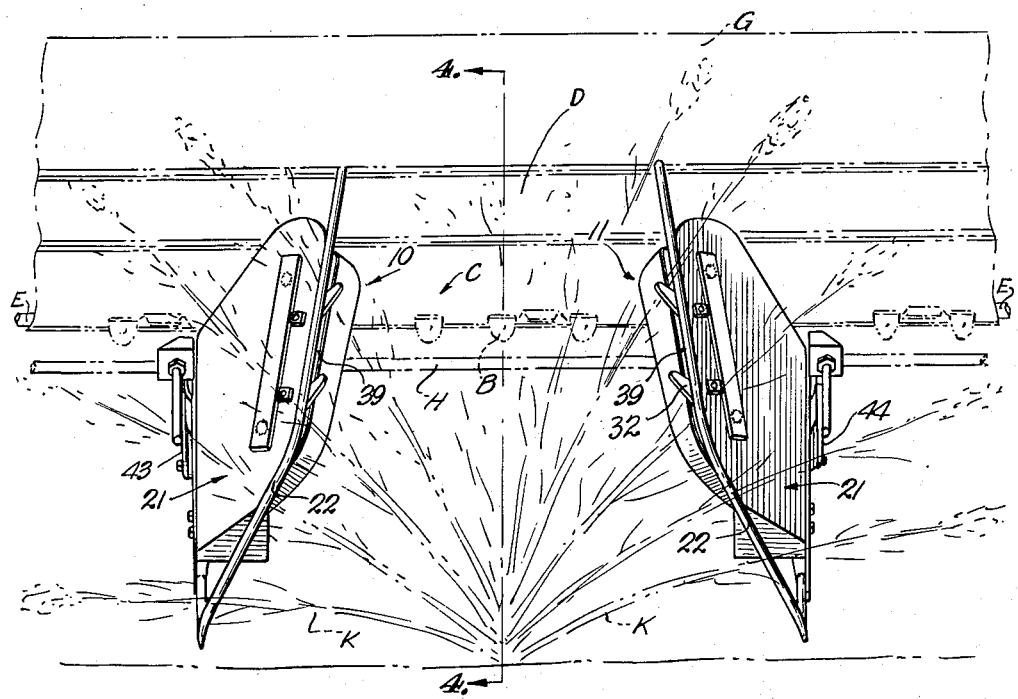
Fig. 2 is a front view taken pretty much at ground level and showing the approaching combine as it moves toward the viewer along the row.
Figure 3:
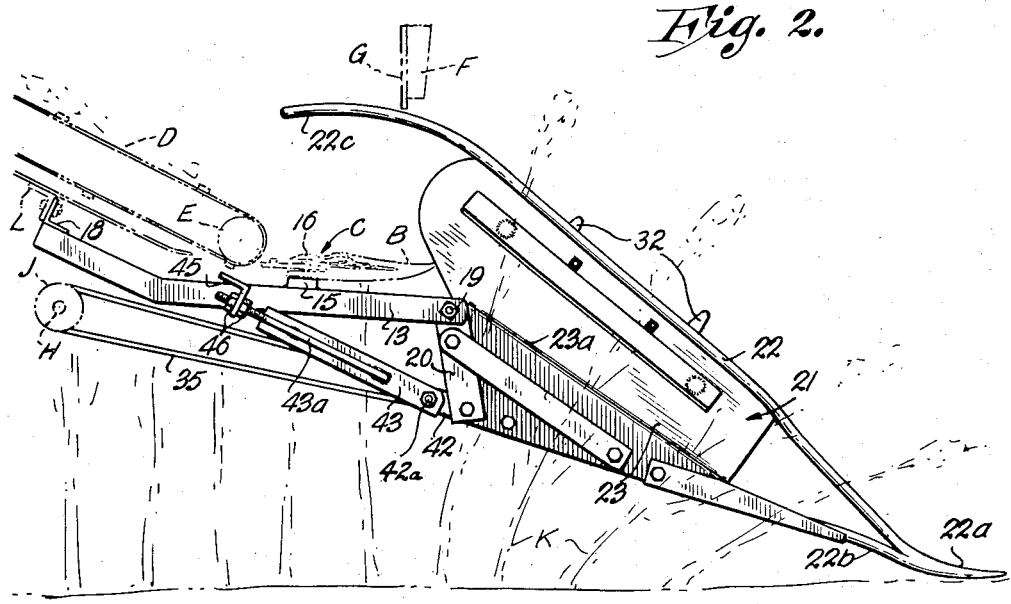
Fig. 3 is a side elevation taken toward the outside of one of the pickup units.

The lifting devices of the present invention are identified generally by reference numerals 10 and 11, the difference in reference numerals designating whether the units are "right-hand" or "left-hand." As will be observed from Figs. 1 and 2, the units 10 and 11 are disposed on opposite sides of the row and for the most part extend forwardly of the cutter bar C of the combine. As will later be explained in more detail, they are firmly secured to the cutter bar through the medium of connecting brackets. So far as the construction is concerned, except for being mirror images of one another, the lifting devices are identical in construction and consequently, the same reference numerals will be used to indicate like parts in the two devices to simplify the understanding thereof.

The connecting means and support for each lifting device comprises a bracket which underlies the cutter bar and apron of the combine and is formed of two parallel angles 13 and 14. These angles are connected with one another immediately beneath the cutter bar by a crosspiece 15 which is perforated to receive therethrough bolts 16 and 17 which form a part of the combine structure and serve to hold the guards in place on the cutter bar. Another crosspiece 18 is provided at the rear of the bracket and this crosspiece is provided with a flange which registers with and is secured to an angle iron L forming a part of the illustrated combine structure. This angle iron L runs across the combine parallel with roller E and the cutter bar C, in some cases, depending on manufacturer, angle L may have to be added, or the bracket secured directly to the underside of the combine.

The lifting element 10 or 11 on each side of the row is secured to its respective bracket by means of a pivot pin 19 which extends through the angles 13 and 14 and pins between them the mounting block 20, which as will later be explained, provides structural support for the balance of the lifting element. It will be observed from Figs. 3 and 4 that mounting block 20 ordinarily depends below pivot pin 19. Rigidly secured to the mounting block 20 and extending forwardly thereof is the inclined housing 21 which is surmounted on its upper edge by the inclined crop lifting and guiding surface 22. In its preferred form this surface is formed by a rod-like element secured to the upper edge of the housing (the housing, of course, having the same contour along its upper edge as the rod). The rod terminates at its forward end in a slightly upturned show 22a with a barbed portion 22b extending rearwardly toward the base of the housing for a short distance. At its rearward end rod 22 levels out and turns slightly down again as at 22c. As is shown in Fig. 4, the rod or guide surface-forming member reaches its maximum height relative the cutter bar directly over the cutter bar, although the exact location fore and aft with respect to the cutter bar will vary somewhat as the unit is pivoted, as will later be described. Preferably, the maximum height is only slightly less than the path circumscribed by the reel bat G during rotation of the reel.

Figure 7:
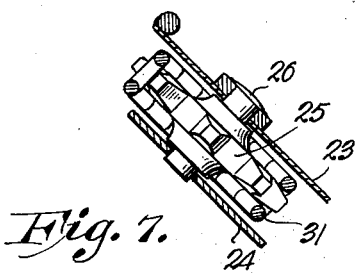
Fig. 7 is a further enlarged sectional view taken along the line 7—7 of Fig. 4 in the direction of the arrows.

The housing 21 is constructed of sheet metal, its outer surface being indicated at 23, and its inner surface at 24. It will be observed, particularly from Figs. 4 and 5, that the housing forms an enclosure for a system of pulleys, chain and sprockets. There is a forward sprocket 25 mounted for rotation about a pin 26 (see Fig. 7). Mounted in the same plane is a rearward sprocket 28 journalled for rotation about a pin 29 extending through the housing. Extending between the sprockets and firmly secured to the housing is a spacer element 30, the ends of the spacer element, of course, being so formed as to avoid interference with the rotation of the sprockets. Trained around sprockets 25 and 28 is an endless chain 31 of the usual flexible type. This chain carries on it at spaced intervals fingers or teeth 32 which lie in the same plane as the sprockets, or in parallel planes, and are sufficiently long as to extend vertically above the crop lifting and guide surface 22. It will be observed that the upper flight of chain 31 lies parallel with and closely adjacent the guide surface over a substantial portion of its length. It is desirable to place the lower sprocket 25 as far forward as possibly can be done so that the chain will run parallel to the lift and guide surface for a substantial proportion of its length.

To insure of a rigid mounting for the sprocket pins 26 and 29, a reinforcing bar 33 is welded to the outer housing surface 23 and the pins are welded thereto.

The rear sprocket 28 has integral therewith a sheave 34 which is likewise journaled on pin 29. The sheave 34 and sprocket 28 turn together. Sheave 34 has trained around it one end of an endless belt 35 which is preferably circular in cross section due to the angles which it must make in leading to the drive shaft. Belt 35 passes, respectively, around two idler pulleys 36 and 37 which are disposed below the rear sprocket 28 as shown in Fig. 4 and Fig. 5. The respective flights of the belt are turned at an acute angle and the belt leaves the housing through an aperture 38 which is best seen in Fig. 5. The belt leads to the sheave J on shaft H earlier mentioned. It will thus be seen that rotation of shaft H will cause the rotation of pulley 34 and the sprocket 28 integral therewith to drive the chain 31 and move the teeth 32 upwardly parallel to and along the crop-lifting and guide surface 22.

The housing is, of course, supplied with a continuous elongate opening 39 through which the teeth or fingers 32 project.

The bottom of the housing in the preferred embodiment is reinforced by an angle iron 40 which overlaps mounting block 20. Angle iron 40 is secured to the mounting block 20 by bolt 41. The angle iron 40 extends past the rear of the block for a short distance. There is a similar projection 42 on the opposite side of the housing (see Fig. 3). Pinned to these projections by bolts 41a and 42a are parallel links 43 and 44 which extend rearwardly and upwardly. Each link is preferably a piece of bar stock having secured thereto a rod portion 43a or 44a threaded at its free end. The threaded portion of each rod 44 extends through an apertured bracket 45 secured to angle iron 13 or 14 as the case may be. On opposite sides of each bracket 45 are provided adjusting nuts 46 which are threaded onto the rods 43a and 44a and which provide means for the adjustment of the length of the links 43 or 44. It will be evident that as viewed in Fig. 3, lengthening of links 43 and 44 will cause the lifting and guide element to rotate counterclockwise about its pivot 19 and raise the nose 22a. Conversely, shortening of the links 43 and 44 will draw the nose down and rotate the element clockwise. It is through the adjustments of the nuts 46 on the two adjusting links 43 and 44 that the position of the guide element relative the cutter bar of the combine is determined.

Returning now again to the lift and guide surface 22, it will be observed that this lies in a plane which is inclined inwardly toward the crop row. I have found that for optimum results this plane should be approximately 45°, although it may vary from 40° to 50°, depending on the height of the stalk to be lifted and on the degree of tilt of the element with respect to the cutter bar. In the illustrated embodiment the rod or guide surface 22 lies in a plane which is at an angle of 45° with and passes through the line break 23a along the outer surface of the housing. By forming the guide surface so as to lie within the inclined 45° plane, the guide surface is maintained in contact with the stalk as it is lifted at substantially the same point on the stalks despite the upper displacement thereof. This, of course, results in less tension being applied along the stalk in the direction of uprooting it, and furthermore avoids the likelihood of stripping seed, etc. from the stalks.

In operation, the guide elements 10 and 11 are mounted on the combine in such relation to one another that their nose portions 22a are spaced apart approximately the average height of the plant which is being harvested. Stated otherwise, the leading end 22a of each guide element is spaced from the center of the row approximately half the height of the average stalk. This is a considerably greater spacing than has ever been employed in the past and it is a critical and highly valuable feature of my invention. When taken in combination with the inclined arrangement of the guide surfaces 22, it produces the ultimate objective sought.

To harvest the crop, the combine is moved along the row with the lift and guide elements on opposite sides and equidistant from the row center. The leading end 22a is positioned to ride close to the ground so as to slip beneath the downed stalks. As the combine advances the stalks K ride up the surface 22 and since the engagement with the stalk is approximately at the midpoint thereof, the lifting is gentle. Lifting takes place rather slowly as compared with other units of which I have knowledge and, consequently, there is little or no whipping action tending to impose undue and severe stresses on the stalk. As the combine continues to advance, the stalks are raised sufficiently that their heads are engaged by the bat G of the combine reel, thus throwing the stalk into the cutter bar and causing severing of the head. Inasmuch as engagement of the stalk is at the midpoint, and inasmuch as the stalks are not lifted upright, there is less stalk cut during the combining operation than in those units where the stalks are channeled into a narrow throat and are thus jerked vertical.

The riding up of the stalks on the guide surface is assisted materially by the moving teeth 32. While in other units it is necessary to have springs or other pressure devices to keep the stalk in engagement with gathering chains or the like, in my invention the weight of the head of the stalk causes the stalk to remain in contact with the surface 22 and thus in position to be engaged by the teeth 32. The pulleys 25 and 28, the sheave 34 and the sheave J on the power shaft H are dimensioned in such fashion as to cause the teeth to move rearwardly at approximately the same speed the combine is moving forwardly, whereby the stalks are held stationary relative the advance of the combine. This again assists in avoiding an accumulation of "trash" in the threshing mechanism and results in the gentlest possible handling of the stalks. This latter feature is, of course, important in the harvesting of soy beans and like crops where the stalks or seed pods are fragile and likely to be shattered if roughly handled.

It will be understood that more than one pair of lift and guide elements 10 and 11 can be mounted on any one combine. I have shown one pair only merely to simplify the explanation and conserve space on the drawings.

Of course, it is evident that the spacing of the devices 10 and 11 from one another and their relative positions along the cutter bar can be changed by disconnecting the units and reconnecting them in the desired positions. The sheaves J can be moved lengthwise of shaft H to align them with the repositioned devices, and again locked to the shaft. Thus the invention is readily adaptable to the handling of crops of various heights and types with a minimum of difficulty.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Row crop pickup apparatus adapted to be mounted ahead of the cutter bar of a harvesting machine comprising a pair of plant lifting and guide elements having forward pickup ends adapted to be disposed ahead of and below the level of said cutter bar and upwardly inclined lifting and engaging surfaces extending from the pickup ends to points above and behind the cutter bar and converging toward one another, said lifting and engaging surfaces lying in planes inclined from the horizontal and converging toward one another in an upward direction, each said plane intersecting the cutter bar along a line substantially normal to the cutter bar.

2. A row crop pickup apparatus as in claim 1 in which the lifting and engaging surfaces lie in a planes at an angle with the horizontal of between 40° and 50°.

3. A row crop pickup apparatus as in claim 1 wherein the pickup ends are spaced from one another a distance substantially equal to the height of the plant to be harvested.

4. Row crop pickup apparatus adapted to be mounted ahead of the cutter bar of a harvesting machine comprising a pair of plant lifting and guide elements having forward pickup ends adapted to be disposed ahead of and below the level of said cutter bar and upwardly inclined lifting and engaging surfaces extending from the pickup ends to points above and behind the cutter bar and converging toward one another, said lifting and engaging surfaces lying in planes inclined from the horizontal and converging toward one another in an upward direction, each said plane intersecting the cutter bar along a line substantially normal to the cutter bar, each lifting and guide element including an endless flexible carrier having a portion parallel with said lifting and engaging surface and adjacent thereto, means on said element supporting said carrier for movement relative thereto, and conveying teeth mounted on and spaced along said carrier, said teeth so formed and oriented that when moving adjacent and parallel to said surface, they project above the level of said surface whereby to engage a plant lying across said surface.

5. Row crop pickup apparatus as in claim 4 in which the lifting and engaging surfaces lie in planes at an angle with the horizontal between 40° and 50°.

6. A row crop pickup apparatus adapted to be mounted ahead of the cutter bar of a harvesting machine, comprising a plant lifting and guide element having a forward pickup end adapted to be disposed ahead of and below the level of said cutter bar and an upwardly inclined lifting and engaging surface extending from the pickup end to a point above and behind the cutter bar, said lifting and engaging surface lying in a plane inclined from the horizontal and intersecting the cutter bar along a line substantially normal to the cutter bar, said lifting and guide element further including an endless flexible carrier having a portion parallel with said lifting and engaging surface and adjacent thereto, means on said element supporting said carrier for movement relative thereto, and conveying teeth mounted on and spaced along said carrier, said teeth so formed and oriented that when moving adjacent and parallel to said surface, they project above the level of said surface whereby to engage a plant lying across said surface.

References Cited in the file of this patent

UNITED STATES PATENTS

| | | |
|---|---|---|
| 2,456,404 | Good | Dec. 14, 1948 |
| 2,713,240 | West | July 19, 1955 |
| 2,746,231 | Ayers | May 22, 1956 |
| 2,783,603 | Smith et al. | Mar. 5, 1957 |
| 2,835,097 | Sullivan | May 20, 1958 |